(12) United States Patent
Gaubil et al.

(10) Patent No.: US 9,233,867 B2
(45) Date of Patent: Jan. 12, 2016

(54) REFRACTORY BLOCK AND GLASS FURNACE

(75) Inventors: Michel Gaubil, Les Angles (FR); Ludovic Massard, Monteux (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 475 days.

(21) Appl. No.: 13/703,848

(22) PCT Filed: Jun. 15, 2011

(86) PCT No.: PCT/IB2011/052597
§ 371 (c)(1),
(2), (4) Date: Feb. 5, 2013

(87) PCT Pub. No.: WO2011/161588
PCT Pub. Date: Dec. 29, 2011

(65) Prior Publication Data
US 2013/0125593 A1   May 23, 2013

(30) Foreign Application Priority Data
Jun. 21, 2010   (FR) ..................... 10 54922

(51) Int. Cl.
*C03B 5/43* (2006.01)
*C04B 35/109* (2006.01)
*C04B 35/484* (2006.01)

(52) U.S. Cl.
CPC ................ *C03B 5/43* (2013.01); *C04B 35/109* (2013.01); *C04B 35/484* (2013.01); *C04B 2235/3201* (2013.01); *C04B 2235/3208* (2013.01); *C04B 2235/3217* (2013.01); *C04B 2235/3225* (2013.01); *C04B 2235/3248* (2013.01); *C04B 2235/3409* (2013.01); *C04B 2235/3418* (2013.01); *C04B 2235/72* (2013.01); *C04B 2235/95* (2013.01)

(58) Field of Classification Search
CPC ................................ C03B 5/43; C04B 35/109
See application file for complete search history.

(56) References Cited

U.S. PATENT DOCUMENTS

| | | | |
|---|---|---|---|
| 2,438,552 A | 3/1948 | Field | |
| 8,497,221 B2 * | 7/2013 | Alasia | C03B 5/43 501/105 |
| 2005/0159294 A1 | 7/2005 | Boussant-Roux et al. | |
| 2007/0015655 A1 * | 1/2007 | Avedikian et al. | 501/128 |

FOREIGN PATENT DOCUMENTS

| EP | 0 939 065 B1 | 5/2002 |
|---|---|---|
| FR | 1.208.577 | 7/1958 |
| FR | 75.893 | 6/1959 |
| FR | 82.310 | 4/1962 |
| FR | 2 875 497 A1 | 3/2006 |
| FR | 2 940 276 A1 | 6/2010 |
| WO | WO 03/074445 A1 | 9/2003 |
| WO | WO 2010/073195 A1 | 7/2010 |

OTHER PUBLICATIONS

Oct. 6, 2011 Written Opinion of International Searching Authority issued in Application No. PCT/IB2011/052597 (with translation).
Oct. 6, 2011 International Search Report issued in Application No. PCT/IB2011/052597 (with translation).

* cited by examiner

*Primary Examiner* — Karl Group
(74) *Attorney, Agent, or Firm* — Oliff PLC

(57) ABSTRACT

A fused refractory product having the following average chemical composition, in % by weight on the basis of oxides and for a total of 100%: $ZrO_2$: 30-50%; $SiO_2$: 8-16%; $Al_2O_3$: balance to 100%; $Y_2O_3 \geq 50/ZrO_2$ and $Y_2O_3 \leq 5\%$; $Na_2O+K_2O+B_2O_3 \geq 0.2\%$ and $SiO_2/(Na_2O+K_2O+B_2O_3) \geq 5 \times Y_2O_3$; CaO: $\leq 0.5\%$; and other oxide species: $\leq 1.5\%$.

13 Claims, No Drawings

REFRACTORY BLOCK AND GLASS FURNACE

TECHNICAL FIELD

The invention relates to a fused AZS (alumina-zirconia-silica) refractory product.

BACKGROUND

Among refractory products, a distinction is made between fused products, which are well known for the construction of glass furnaces, and sintered products.

Unlike sintered products, fused products usually comprise an intergranular vitreous phase binding the crystallised grains. The problems raised by sintered products and by fused products, and the technical solutions adopted to solve them, are therefore generally different. A composition developed to manufacture a sintered product is therefore not basically usable as such to manufacture a fused product, and vice versa.

Fused products, often called "electrofused" products, are obtained by melting a mixture of suitable batch materials in an electric arc furnace or by any other technique suitable for these products. The bath of molten material is then cast in a mould and the product obtained undergoes a controlled cooling cycle.

Among fused products, AZS electrofused products, that is mainly comprising alumina ($Al_2O_3$), zirconia ($ZrO_2$) and silica ($SiO_2$), have been known for decades. U.S. Pat. No. 2,438,552 describes one of the first improvements made to this type of product. The authors recommend adding $Na_2O$ (1-2.2%) and MgO/CaO (0.2-0.8%) to solve problems of feasibility concerning products comprising less than 70% $Al_2O_3$, from 14 to 40% $ZrO_2$ and from 9 to 12% $SiO_2$.

EP 0 939 065 B1 proposes to reduce the degree of exudation of AZS products containing 20 to 59% zirconia by adding $B_2O_3$, $P_2O_5$ and at least one of the oxides of the group $SnO_2$, ZnO, CuO and $MnO_2$. Adding the said oxides, which are not present as impurities in conventional starting materials, leads to production overcosts and possibly to problems with staining.

FR 2 875 497 proposes to reduce the degree of exudation of AZS products by selecting a chemical analysis such that $ZrO_2$: 15.5 to 22%, $SiO_2$: 10.5 to 15% and $Na_2O+K_2O+Li_2O$: 1.0 to 2.5%, in particular if the $Al_2O_3/ZrO_2$ weight ratio is equal to or higher than 2.9, and if the $SiO_2/(Na_2O+K_2O+Li_2O)$ weight ratio is higher than 7 and/or lower than 9.

French application FR 08 58914 or application WO 2010/073195 proposes to improve the corrosion resistance of AZS products by adding $Y_2O_3$ for a chemical analysis such that $ZrO_2$: 30 to 46%, $SiO_2$: 10 to 16% and $Na_2O+K_2O$: 0.5 to 5%.

In all the examples according to the invention of these applications (Examples 4 to 10), $SiO_2/(Na_2O+K_2O+B_2O_3) < 5 \times Y_2O_3$. In contrast, none of the examples which meet the criteria $SiO_2/(Na_2O+K_2O+B_2O_3) \geq 5 \times Y_2O_3$, except for Example 11, conforms to the invention of the said applications.

AZS products which are sold today by Saint-Gobain SEFPRO, such as ER-1681, ER-1685, and ER-1711, contain 45 to 50% $Al_2O_3$, 32 to 41% $ZrO_2$, 12 to 16% $SiO_2$ and about 1% $Na_2O$. ER-2001 SLX contains about 68% $Al_2O_3$, 17% $ZrO_2$, 13% $SiO_2$ and 1.7% $Na_2O$.

These products are suitable for manufacturing glass furnaces. More particularly, current commercially available AZS products are mainly used for the zones in contact with the glass melt and for the superstructure of glass furnaces.

These products are efficient but a permanent need exists to improve the conditions for controlling the glass furnaces and the quality of the glass.

In particular, for blocks of AZS fused product constituting the vessels of glass furnaces, it is important to limit the problems of exudation at the operating temperatures.

A need therefore exists for an AZS fused product having good resistance to corrosion by the glass melt and not having any problem of exudation at the operating temperatures of the vessels of glass furnaces.

It is the object of the present invention to satisfy this need.

SUMMARY

More particularly, the invention relates to a fused refractory product comprising the following chemical composition, as a percentage by weight, based on the oxides and for a total of 100%:
  $ZrO_2$: 30-50%;
  $SiO_2$: 8-16%;
  $Al_2O_3$: complement to 100%;
  $Y_2O_3 \geq 50/ZrO_2$ and $Y_2O_3 \leq 5\%$;
  $Na_2O+K_2O+B_2O_3 \geq 0.2\%$ and $SiO_2/(Na_2O+K_2O+B_2O_3) \geq 5 \times Y_2O_3$;
  CaO: $\leq 0.5\%$;
  Other oxide species: $\leq 1.5\%$.

As shown in greater detail in the rest of the description, such a product has good resistance to corrosion by the glass melt and does not have any problem of exudation at the operating temperatures of vessels of glass furnaces.

A product according to the invention may further comprise one or more of the following optional features:
  $ZrO_2 \geq 32\%$, or $ZrO_2 \geq 35\%$, and/or $ZrO_2 \leq 45\%$, or $ZrO_2 \leq 42\%$;
  $SiO_2 \geq 10\%$, or $SiO_2 \geq 11\%$ and/or $SiO_2 \leq 15\%$;
  $Al_2O_3 \geq 38\%$, or $Al_2O_3 \geq 40\%$ and/or $Al_2O_3 \leq 52\%$, or $Al_2O_3 \leq 50\%$;
  The $Y_2O_3$ content is higher than $60/ZrO_2$, or higher than $70/ZrO_2$;
  The $Y_2O_3$ content is equal to or higher than 1.2%, or equal to or higher than 1.5%, or equal to or higher than 2.0%, or equal to or higher than 2.5%, or equal to or higher than 2.7%;
  The $Y_2O_3$ content is lower than or equal to 4.5%, or lower than or equal to 4.0%;
  The $Na_2O+K_2O+B_2O_3$ content is higher than 0.3%, higher than 0.4%, or higher than 0.5% and/or lower than 4.0%, lower than 3.0%, lower than 2.5%, lower than 2.0%, lower than 1.5%, or lower than 1.2%, or lower than 1.1%, or lower than 1.0%, lower than 0.9%, lower than 0.8%;
  The $Na_2O$ content is higher than 0.3%, higher than 0.4%, or higher than 0.5%, and/or lower than 4.0%, lower than 3.0%, lower than 2.5%, lower than 2.0%, lower than 1.5%, or lower than 1.2%, or lower than 1.1%, or lower than 1.0%, lower than 0.9%, lower than 0.8%;
  The $SiO_2/Na_2O$ weight ratio is higher than $5.3 \times Y_2O_3$, or higher than $5.5 \times Y_2O_3$, or higher than $5.7 \times Y_2O_3$, or higher than $6 \times Y_2O_3$;
  The $SiO_2/Na_2O$ weight ratio is higher than 11, or higher than 12, or higher than 13, or higher than 14, or higher than 15;
  The "other oxide species" are impurities;
  The product is in the form of a block.
  In a preferred embodiment:
    $ZrO_2$: 32-45%; and
    $SiO_2$: 10-15%; and Al$_2$O$_3$: 40-50%; and
Y$_2$O$_3$: 2.2-4.0%; and
Na$_2$O: 0.4-1.2%.

The invention further relates to a method for manufacturing a refractory product according to the invention, comprising the following successive steps:
a) mixing batch materials in order to form a starting batch,
b) melting the said starting batch until a bath of molten material is obtained,
c) casting and solidifying the said melt, by controlled cooling, in order to obtain a fused refractory product, the said method being characterised in that the said batch materials are selected so that the said fused refractory product has a composition according to that of a product according to the invention.

The invention further relates to a glass furnace comprising a product according to the invention, in particular a product manufactured or manufacturable by a method according to the invention, in particular in a zone of the furnace in which the product is liable to enter into contact with a glass melt or with gases liberated by the melting of the glass, and in particular in the superstructure (crown).

DEFINITIONS

In general, the term "fused product", "fused and cast product" or "obtained by fusion" means a solid product, optionally annealed, obtained by complete solidification, by cooling, of a bath of molten material. A "bath of molten material" is a mass which, to preserve its shape, must be confined in a receptacle. A bath of molten material, apparently liquid, may contain solid portions, but not in a sufficient quantity for them to structure the said mass.

A product according to the invention may comprise hafnium oxide HfO$_2$, naturally present in sources of zirconia. Its weight content in the product according to the invention is lower than or equal to 5%, generally lower than or equal to 2%. "ZrO$_2$" conventionally means zirconia and these traces of hafnium oxide. HfO$_2$ is therefore not included in "other oxide species".

"Impurities" means the inevitable components, necessarily introduced with the batch materials or resulting from reactions with the said components. In particular, oxides of iron and titanium are known to be harmful and their content must be limited to traces introduced as impurities with the batch materials. Preferably, the weight content of Fe$_2$O$_3$+TiO$_2$ is less than 0.55%.

In formulas comprising a ratio (without units) between the weight percentages of components, for example SiO$_2$/(Na$_2$O+K$_2$O+B$_2$O$_3$) and a content (as a percentage by weight) of another component, for example 5Y$_2$O$_3$, the relation is purely mathematical in order to bound a range of compositions. The same goes for formulas comprising the inverse of a content (50/ZrO$_2$) and a content (Y$_2$O$_3$).

Unless otherwise stated, all the percentages of the present description are percentages by weight on the basis of the oxides.

DETAILED DESCRIPTION

A product according to the invention can be manufactured by following steps a) to c) described below:
a) mixing batch materials in order to form a starting batch,
b) melting the said starting batch until a bath of molten material is obtained,
c) casting and solidifying the said bath of molten material, by controlled cooling, in order to obtain a refractory product according to the invention.

In step a), the batch materials are determined in order to guarantee a composition, in the finished product, conforming to the invention.

The presence of yttrium oxide is necessary in the products of the invention, but its content must not exceed 5%, at the risk of deteriorated feasibility.

A Y$_2$O$_3$ content equal to or higher than 50/ZrO$_2$ is necessary to obtain good resistance to corrosion by the glass melt.

The presence of sodium and/or potassium and/or boron oxide is necessary to confer suitable physical and chemical properties on the vitreous phase. However, the Na$_2$O+K$_2$O+B$_2$O$_3$ content must not exceed a value such that SiO$_2$/(Na$_2$O+K$_2$O+B$_2$O$_3$)≥5×Y$_2$O$_3$, otherwise, at the operating temperatures of the glass furnace, the vitreous phase is liable to flow on the surface of the product, which would thereby lose its cohesion and its corrosion resistance. In one embodiment, K$_2$O and/or B$_2$O$_3$ are only present as impurities.

The presence of calcium oxide is harmful in the products of the invention because it is liable to generate crystals of calcium aluminate in the vitreous phase. The presence of these crystals can cause cracks in the product. Furthermore, an excessively high CaO content leads to dissolution of the zirconia crystals, which decreases the corrosion resistance of the product. The CaO content must therefore not exceed 0.5%.

In step b), melting is preferably carried out by the combined action of a fairly long electric arc, not causing reduction, and mixing that promotes the reoxidation of the products.

To minimise the formation of nodules having a metallic appearance and to prevent the formation of splits or cracks in the final product, it is preferable to carry out the fusion in oxidising conditions.

Preferably, the long arc fusion process described in French patent 1 208 577 and its additions 75893 and 82310 is used.

This method consists in using an electric arc furnace whereof the arc is injected upwardly between the feed and at least one electrode separated from the said feed and in adjusting the length of the arc so that its reducing action is reduced to the minimum, while maintaining an oxidising atmosphere above the bath of molten material and by mixing the said bath, either by the action of the arc itself, or by bubbling an oxidising gas (air or oxygen, for example) through the bath, or even by adding oxygen-releasing substances, such as peroxides, to the bath.

In step c), the bath of molten material is preferably cast in a mould suitable for producing a block. Cooling is preferably carried out at a temperature ramp-down of about 10° C. per hour.

Any conventional method for manufacturing AZS fused products intended for applications in glass furnaces can be implemented, provided that the composition of the starting batch serves to obtain products having a composition according to that of a product according to the invention.

A product according to the invention may constitute all or part of a block.

The block may in particular have a mass of over 10 kg, of more than 20 kg, or even of more than 50 kg, more than 150 kg, more than 300 kg, or even more than 900 kg and/or less than 2 tonnes. In particular, it may have a mass of about 1 tonne.

The shape of the block is non-limiting.

The block may have at least one dimension (thickness, length or width) of at least 150 mm, preferably at least 200 mm, or even at least 400 mm, or even at least 600 mm, or even at least 800 mm, or even at least 1000 mm, or even at least 1600 mm.

In an advantageous embodiment, the thickness, length and width of the block are at least 150 mm, or even at least 200 mm, or even at least 300 mm, or even at least 400 mm.

A product according to the invention may also be used in the form of a thin product, that is to say, having a thickness between 50 and 150 mm, in particular a thickness lower than 120 mm, or even lower than 100 mm. It may in particular be in the form of a slab.

Preferably, the block or the slab forms part or constitutes a wall or the hearth of a furnace, in particular of a glass furnace.

Examples

The following non-limiting examples are provided to illustrate the invention.

In these examples, the following batch materials have been employed:
zirconia CC10 sold by Société Européenne des Produits Réfractaires, mainly containing, on average, by weight, 98.5% $ZrO_2$, 0.5% $SiO_2$ and 0.2% $Na_2O$,
zircon sand containing 33% silica,
type AC44 alumina sold by Pechiney and containing on average 99.4% $Al_2O_3$,
sodium carbonate containing 58.5% $Na_2O$,
yttrium oxide having a purity above 99%.

The products were prepared by the conventional arc furnace melting process, and then cast to obtain blocks in format 200×40×150 mm$^3$.

The chemical analysis of the products obtained is given in Table 1; this is an average chemical analysis, given as a percentage by weight. Example 9 further comprises 2.1% by weight of boron oxide ($B_2O_3$); alumina $Al_2O_3$ and impurities constitute the complement to 100%. For the other examples, alumina $Al_2O_3$ and impurities constitute the complement to 100%.

Evaluation of the Exudation Resistance (Test A)

Samples of the blocks prepared were taken in the form of cylinders having a length of 100 mm and a diameter of 24 mm, and were then heated to 1550° C. The behaviour of the sample was observed by a camera and the temperature corresponding to the incipient flow of the vitreous phase on the sample surface was recorded. This temperature is given in ° C. in Table 1.

incipient flow of the vitreous phase on the surface of the sample is substantially increased.

A comparison of Example 8 with Example 10, Example 11 or Example 4 shows a drop in this temperature when the ratio falls below 5 times the yttrium oxide content.

A comparison of Example 9 with Example 7, or with Example 6, also illustrates the effect of this ratio on the said temperature.

Example 1 shows a highly satisfactory temperature in test A, but a corrosion resistance lower than that of the products of the invention.

Obviously, the present invention is not limited to the embodiments described and provided as illustrative and non-limiting examples.

In particular, the products according to the invention are not limited to particular shapes or dimensions, nor to the application to glass furnaces.

The invention claimed is:

1. A fused refractory product comprising the following chemical composition, as a percentage by weight, based on oxides and for a total of 100%:
$ZrO_2$: 30-50%;
$SiO_2$: 8-16%;
$Al_2O_3$: complement to 100%;
$Y_2O_3 \geq 50/ZrO_2$ and $Y_2O_3 \leq 5\%$;
$Na_2O+K_2O+B_2O_3 \geq 0.2\%$ and $SiO_2/(Na_2O+K_2O+B_2O_3) \geq 5 \times Y_2O_3$;
CaO: $\leq 0.5\%$; and
Other oxide species: $\leq 1.5\%$.

2. The product according to claim 1, wherein the yttrium oxide content is higher than the ratio $60/ZrO_2$.

3. The product according to claim 1, wherein the yttrium oxide content is higher than the ratio $70/ZrO_2$.

4. The product according to claim 1, wherein the total content of alkaline oxides $Na_2O+K_2O+B_2O_3$ is lower than 1.5%.

5. The product according to claim 4, wherein the total content of alkaline oxides $Na_2O+K_2O+B_2O_3$ is lower than 1.1%.

6. The product according to claim 1, wherein $SiO_2/Na_2O \geq 5.5 \times Y_2O_3$.

7. The product according to claim 1, wherein the $SiO_2/Na_2O$ weight ratio is higher than 12.

8. The product according to claim 1, wherein the zirconia content is higher than 32% and/or the silica content is higher

TABLE 1

| Example | $ZrO_2$ | $SiO_2$ | $Na_2O$ | $Y_2O_3$ | $50/ZrO_2$ | $SiO_2/(Na_2O + B_2O_3)$ | $5 \times Y_2O_3$ | Test A (° C.) |
|---|---|---|---|---|---|---|---|---|
| 1 | 36.0 | 14.0 | 1.40 | 0.06 | 1.39 | 10.0 | 0.3 | 1450 |
| 2 | 36.0 | 14.0 | 1.40 | 3.00 | 1.39 | 10.0 | 15.0 | 1350 |
| 3 | 35.6 | 14.0 | 1.09 | 3.21 | 1.40 | 12.8 | 16.1 | 1400 |
| 4 | 36.0 | 12.2 | 0.80 | 2.98 | 1.39 | 15.3 | 14.9 | 1440 |
| 5 | 35.6 | 14.0 | 0.72 | 3.28 | 1.40 | 19.4 | 16.4 | 1440 |
| 6 | 39.9 | 11.6 | 0.41 | 2.72 | 1.25 | 28.3 | 13.6 | 1450 |
| 7 | 39.6 | 12.0 | 0.41 | 2.88 | 1.26 | 29.3 | 14.4 | 1450 |
| 8 | 36.6 | 12.7 | 0.92 | 3.10 | 1.37 | 13.8 | 15.5 | 1380 |
| 9 | 40.2 | 12.3 | 0.13 | 2.88 | 1.24 | 5.5 | 14.4 | 1365 |
| 10 | 36.0 | 12.9 | 0.30 | 3.30 | 1.39 | 43.0 | 16.5 | 1470 |
| 11 | 36.0 | 14.5 | 0.91 | 2.98 | 1.39 | 15.9 | 14.9 | 1440 |
| 12 | 40.2 | 14.0 | 0.89 | 1.50 | 1.24 | 15.7 | 7.5 | 1420 |

In comparison with Examples 1 to 3, Examples 4 to 7 of the invention clearly demonstrate the role of the weight ratio between $SiO_2$ and ($Na_2O+B_2O_3$). In fact, when this ratio rises above 5 times the yttrium oxide content, the temperature of than 10% and/or the alumina content is higher than 38% and/or the yttrium oxide content is higher than 2.0% and/or the total content of alkaline oxides $Na_2O+K_2O+B_2O_3$ is higher than 0.3%.

9. The product according to claim 1, wherein the zirconia content is lower than 45% and/or the silica content is lower than 15% and/or the alumina content is lower than 52% and/or the yttrium oxide content is lower than 4.5% and/or the content of alkaline oxides $Na_2O+K_2O+B_2O_3$ is lower than 1.2%.

10. The product according to claim 1, wherein:
$ZrO_2$: 32-45%;
$SiO_2$: 10-15%;
$Al_2O_3$: 40-50%;
$Y_2O_3$: 2.2-4.0%; and
$Na_2O$: 0.4-1.2%.

11. The product according to claim 1, in the form of a block having a mass of over 10 kg.

12. A glass furnace, comprising the product according to claim 1.

13. The glass furnace according to claim 12, wherein the product is placed in a zone of the furnace in which it is liable to enter into contact with a glass melt or with gases liberated by the melting of the glass.

\* \* \* \* \*